United States Patent [19]
Rowe

[11] 3,860,037
[45] Jan. 14, 1975

[54] TUBE PLUGGING DEVICE
[75] Inventor: Edward A. Rowe, Mentor, Ohio
[73] Assignee: Diamond Shamrock Corporation, Cleveland, Ohio
[22] Filed: June 26, 1973
[21] Appl. No.: 373,755

[52] U.S. Cl. ................................. 138/89, 138/114
[51] Int. Cl. ............................................. F16l 55/10
[58] Field of Search ........... 138/89, 90, 38, 114, 97; 73/49.8; 122/360, 362, 364; 285/138, 139, 302

[56] References Cited
UNITED STATES PATENTS

| | | | |
|---|---|---|---|
| 2,107,259 | 2/1938 | Hazel................................... | 138/89 |
| 2,164,195 | 6/1939 | Waltermire....................... | 138/90 X |
| 2,334,303 | 11/1943 | Allen et al........................ | 138/89 X |
| 2,402,157 | 6/1946 | Griswold......................... | 285/302 X |

FOREIGN PATENTS OR APPLICATIONS

| | | | |
|---|---|---|---|
| 928,969 | 6/1963 | Great Britain........................ | 138/89 |

Primary Examiner—Charles A. Ruehl
Attorney, Agent, or Firm—William A. Skinner

[57] ABSTRACT

A device for plugging a section of an open tube in heat transfer equipment has a plug for forming a fluid-tight seal between the inner periphery of the tube and the outer periphery of the plug and a connector tube attached to the plug. The connector tube has a smaller diameter than the open tube so that the connector tube can be used to position and seal the plug in the inlet section of the open tube to form an annular space between the two tubes and has an opening adjacent to the attached plug so that a fluid can be circulated through the connector tube, the opening and the annular space in the sealed inlet section of the open tube. This device may be used to plug a section of the open tube so that a fluid can be circulated within the plugged section but not through the entire tube.

1 Claim, 4 Drawing Figures

TUBE PLUGGING DEVICE

BACKGROUND OF THE INVENTION

1. Field of the Invention

This invention relates to a device for plugging a section of an open tube in heat transfer equipment so that a fluid can be circulated within the plugged section but not through the entire tube.

2. Description of the Prior Art

Various devices have been proposed for plugging leaking tubes in heater exchangers and boilers to take the leaking tube out of service without having to dismantle the heat exchanger or boiler and replace the tube. These devices are useful for plugging a leaky exchanger, condenser or cooler tube in a bundle where only one tube is leaking so that the operation can be continued without shutting down immediately to retube the bundle or replacing the bundle with a new bundle. Although these devices are very useful in the plugging of leaking tubes, they leave a tapered plug tightly wedged in the leaking tube so that the tube is permanently plugged. U.S. Pat. No. 2,856,963 — Hoerter issued Oct. 21, 1958 describes one of these devices.

There is a definite need for an improved tube plugging device for temporarily plugging tubes in heat transfer equipment. This device would be useful in temporarily reducing the heat transfer capacity in heat exchangers, condensers and coolers having excess heat transfer capacity without permanently plugging the tubes.

SUMMARY OF THE INVENTION

The present invention relates to a device for plugging a section of an open tube so that a fluid can be circulated within the plugged section of tube but not through the entire tube. The device is equipped with (a) a plug which forms a fluid-tight seal between the plug and the internal wall of the open tube and (b) a connector tube attached to the plug so that the plug can be inserted and positioned in the open tube. The connector tube is also equipped with an opening adjacent to the plug so that fluid introduced into the connector tube can flow through the bore of the connector tube, pass through the opening into the annular space to an outlet outside the wall and then exit through the outlet.

This device is well adapted for temporarily plugging a section of a tube in heat transfer equipment to reduce heat transfer capacity in equipment having excess heat transfer capacity by circulating fluid within the plugged section but not through the entire tube.

REFERENCE TO DRAWINGS

DESCRIPTION OF THE PREFERRED EMBODIMENTS

Although the present invention has many uses, it is specifically disclosed herein as a device for sealing a section of an open tube in heat transfer equipment such as a steam coil in a vapor degreaser.

Figure 1:
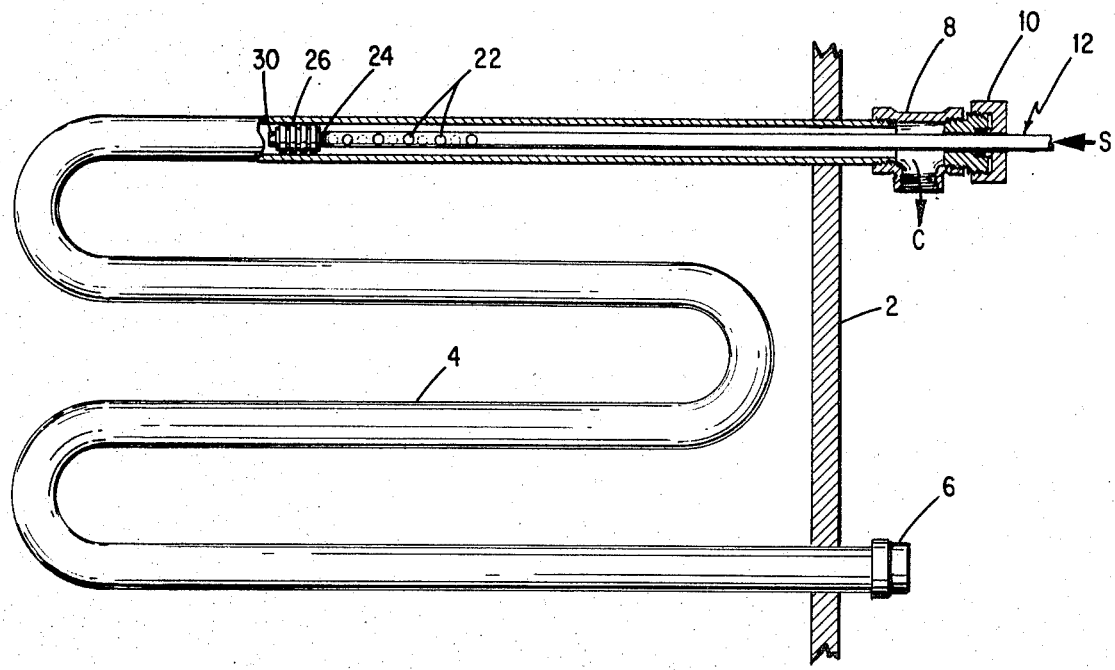
FIG. 1 is a view of an open tube showing the plugging device of this invention.

Referring to FIG. 1, there is shown wall 2 which may be a side wall of any suitable fluid container. Only one wall is shown. Open tube 4 is attached to the side wall of the container and both the outlet and inlet of tube 4 are on the outside of the container. The inlet and outlet of tube 4 have been modified in FIG. 1. The outlet of open tube 4 has been closed by cap 6. Use of cap 6 is optionable. The outlet side of the run of tee fitting 8 has been attached to the inlet of open tube 4 and the inlet side of the run of tee fitting 8 has been attached to packing gland 10. Packing gland 10 positions connector tube 12 inside of open tube 4 to form an annular space between larger tube 4 and smaller connector tube 12. Packing gland 10 also forms a seal around connector tube 12 to prevent escape of fluid from the annular space. Connector tube 12 has a plurality of openings 22 in the opposite end and is attached to threaded nut 24. Openings 22 are shown as circular holes but may be any suitable geometric shape. Likewise, there may be one or more openings 22. Washer 26 is positioned axially on threaded bolt 30 which is then engaged in threaded nut 24. Washer 26 forms a seal with the internal wall of open tube 4.

A fluid such as steam S introduced into the bore of connector tube 12 passes through openings 22 into the annular space between tube 4 and connector tube 12 and leaves the annular space by the branch opening in tee fitting 8 as a fluid such as steam condensate C so that circulation of the fluid occurs only in the sealed inlet section of tube 4.

Figure 2:
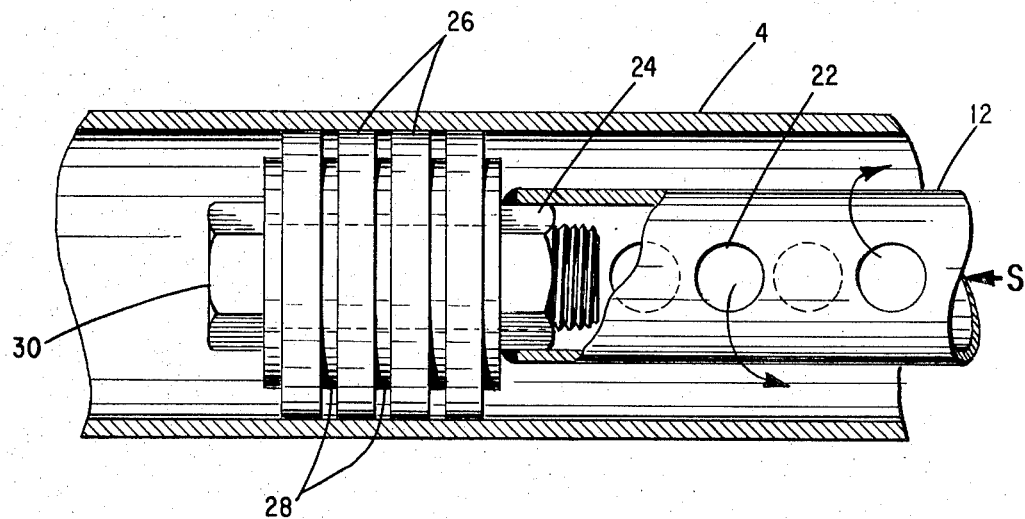
FIG. 2 is an enlarged, side elevational view, partially in section showing the plug, openings in the connector tube and other details on the device in FIG. 1.

FIG. 2 shows operation of the plugging device in greater detail at the point where a fluid tight seal is effected in open tube 4. Fluid S passes through connector tube 12, then through openings 22 into the annular space between tube 4 and connector tube 12. Connector tube 12 is attached to threaded nut 24 in any of several known ways, e.g., welding, etc. Threaded nut 24 is engaged in threaded bolt 30 having several washers 26 and several smaller annular spacers 28 interposed thereon so that the several washers 26 form seals at several points with the internal wall of open tube 4. If desired, annular spacers 28 shown in FIG. 2 may be omitted. Likewise one or more washers 26 may be used.

The plugging device may be positioned in tube 4 by inserting the end of connector tube 12 equipped with washers 26 into packing gland 10 attached to tube 4, then pushing connector tube 12 into tube 4 until washers 26 reach the desired positions in tube 4 and then closing packing gland 10. When positioned inside tube 4, washers 26 form a removable, internal, piston-type seal with the internal wall of tube 4. FIG. 2 shows a seal obtained between four, axially aligned, annular washers 26 and the internal wall of tube 4.

Washers 26 may be fabricated from any type of suitable rubber-like material or polymeric material. The material should be resilient and should not be adversely affected by the fluid being circulated in the annular space between tube 4 and connector tube 12. Annular spacers 28 may also be fabricated from the same materials as washers 26 or from any other suitable fluid resistant material. Tube 4, tube 12, nut 24 and bolt 30 may be constructed from any suitable fluid resistant metal.

Figure 3:
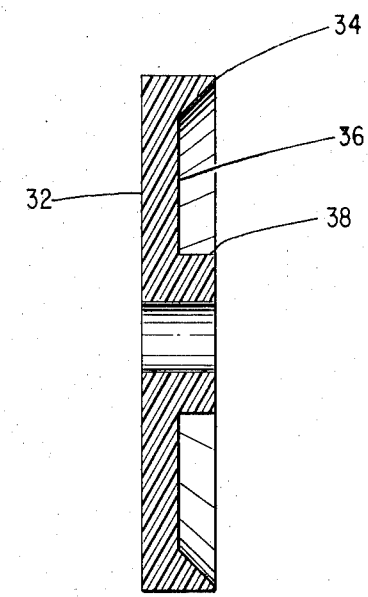
FIG. 3 is an enlarged side elevational view of an embodiment of the washer showing details.

FIG. 3 shows a side elevational view of an embodiment of washer 26 where washer 26 has a flat face 32, a shoulder 34, an undercut portion 36 and a beveled portion 38 to form a fluid tight seal when fluid pressure is applied on shoulder 34, undercut portion 36 and beveled portion 38.

Figure 4:
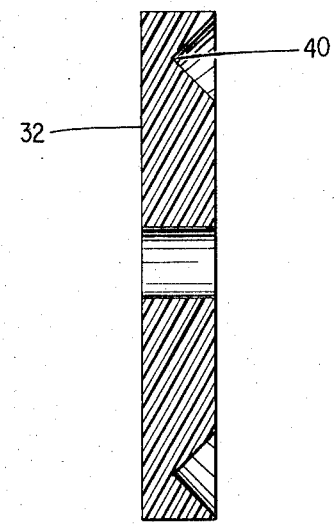
FIG. 4 is an enlarged side elevational view of another embodiment of the washer showing details.

FIG. 4 shows a side elevational view of another embodiment washer 26 where washer 26 has a flat face 32 and a notch 40 to form a fluid tight seal when fluid pressure is applied to notch 40.

While the plugging device of this invention has been described herein in connection with the temporary plugging of a section of an open tube in heat transfer equipment so that a fluid can be circulated within the plugged section but not through the entire tube, it will be apparent to those skilled in the art that the plugging device can be successfully employed for temporarily plugging a tube or pipe carrying a heating or cooling fluid in any type of heat transfer equipment. The device is useful in temporarily reducing heat transfer capacity in heat exchangers, condensers and coolers having excess heat transfer capacity and does not permanently plug the tubes.

This device is well adapted for temporarily plugging a section of a steam coil in a vapor degreaser to reduce heating surface of the steam coil so that a lower boiling chlorinated solvent such as methylene chloride (b.p. 104°F) can be used in a vapor degreaser designed for a higher boiling chlorinated solvent such as perchloroethylene (b.p. 250°F). Conversion of vapor degreasers from higher boiling chlorinated solvents to lower boiling chlorinated solvents presents problems in that the majority of the degreasers are designed for higher boiling solvents such as trichlorethylene (b.p. 188°F) and are not suitable for use with lower boiling solvents which require less heating capacity unless the steam coil is replaced with a steam coil having a smaller heating surface.

Recent requirements of the Environmental Protection Agency as well as compliance with the Occupational Safety and Health Act favor use of the lower boiling chlorinated solvents over the higher boiling chlorinated solvents in vapor degreasers. Methylene chloride is now considered to be ecologically exempt from control by the Environmental Protection Agency because it does not contribute to smog formation. Methylene chloride also has a high Threshold Limit Value or Time Weighted Average which facilitates compliance with the Occupational Safety and Health Act. When methylene chloride is used in a vapor degreaser, working conditions around the degreaser are greatly improved. The work area including the vapor degreaser is much cooler because of the lower boiling point of the methylene chloride. Work coming out of the degreaser is cool to the touch so it can be transferred to the next operation immediately.

There is considerable interest in the conversion of vapor degreasers for higher boiling chlorinated solvents to methylene chloride. Prior to this invention, it was necessary to replace the existing steam coil with a steam coil having a smaller heating surface to convert a vapor degreaser designed for a higher boiling chlorinated solvent to a lower boiling chlorinated solvent such as methylene chloride. The present invention provides an efficient, inexpensive means for conversion of a vapor degreaser designed for a higher boiling chlorinated solvent to methylene chloride. If the need arises, the degreaser can be easily reconverted for use with a higher boiling chlorinated solvent by removal of the plugging device.

It is to be understood that although the invention has been described with specific reference to particular embodiments thereof, it is not to be so limited since changes and alterations therein may be made which are within the full intended scope of this invention as defined in the appended claims.

What is claimed is:

1. A device for reducing the heat transfer capacity of an open tube, which comprises
   a. a plug having a plurality of washers with interposed smaller annular spacers, for forming a fluid-tight seal with the inner surface of the open tube, and
   b. a connector tube attached to the plug, the connector tube having a smaller diameter than the plug to provide an annular space between the open tube inner surface and the connector tube, and at least one opening adjacent to the plug to permit circulation of a fluid through the connector tube, the opening and the annular space.

* * * * *